US009158365B2

(12) United States Patent
Bertin et al.

(10) Patent No.: US 9,158,365 B2
(45) Date of Patent: Oct. 13, 2015

(54) METHOD FOR CONTROLLING THE DISPLAY FOR AN ITEM OF EQUIPMENT IN STANDBY MODE AND ASSOCIATED DEVICE

(75) Inventors: Jean-Pierre Bertin, Cesson Sevigne (FR); Anthony Pesin, Cesson Sevigne Cedex (FR); Jean-Marc Le Foulgoc, Cesson Sevigne Cedex (FR)

(73) Assignee: Thomson Licensing (FR)

( * ) Notice: Subject to any disclaimer, the term of this patent is extended or adjusted under 35 U.S.C. 154(b) by 270 days.

(21) Appl. No.: 13/602,361

(22) Filed: Sep. 4, 2012

(65) Prior Publication Data
US 2013/0057524 A1 Mar. 7, 2013

(30) Foreign Application Priority Data

Sep. 5, 2011 (FR) ..................................... 11 57844

(51) Int. Cl.
| | |
|---|---|
| *G09G 5/00* | (2006.01) |
| *G06F 1/32* | (2006.01) |
| *H04N 5/445* | (2011.01) |
| *H04N 5/63* | (2006.01) |

(Continued)

(52) U.S. Cl.
CPC ................ *G06F 1/3265* (2013.01); *G09G 3/04* (2013.01); *H04N 5/44582* (2013.01); *H04N 5/63* (2013.01); *H04N 21/4436* (2013.01); *G09G 2330/021* (2013.01); *Y02B 60/1242* (2013.01); *Y02B 60/32* (2013.01)

(58) Field of Classification Search
CPC ..... G09G 5/00; G09G 3/04; G09G 2330/021; G06F 1/3265; H04N 5/44582; H04N 21/4436
USPC ............... 345/23, 25, 26, 204, 211, 212, 214, 345/215; 713/320, 323, 324; 348/734
See application file for complete search history.

(56) References Cited

U.S. PATENT DOCUMENTS

| | | | | |
|---|---|---|---|---|
| 5,887,176 A | * | 3/1999 | Griffith et al. ................ | 713/320 |
| 5,931,951 A | * | 8/1999 | Ando ........................... | 713/324 |
| 8,593,470 B2 | * | 11/2013 | Bruno et al. .................. | 345/534 |

(Continued)

FOREIGN PATENT DOCUMENTS

| | | |
|---|---|---|
| CN | 1870845 | 11/2006 |
| KR | 2006033329 | 4/2006 |

OTHER PUBLICATIONS

French Search Report dated Jan. 25, 2012 , 2 pages.

*Primary Examiner* — Joe H Cheng
(74) *Attorney, Agent, or Firm* — Jack Schwartz & Associates, PLLC

(57) ABSTRACT

Method for controlling a display device in an electronic device and associated control device. The electronic device includes a control unit and the display device comprising a plurality of display elements, a display controller and a switching circuit. The display elements have a plurality of pictograms. The display controller having a plurality of storage elements associated with the display elements. The method includes the steps of writing into the storage elements of a contents for display on the display elements, the configuration in standby mode of the electronic device making the storage elements associated with the display elements by the control unit inaccessible, the detection of an event to be indicated by display, and the control of a switching circuit to vary the active pictograms by alternately displaying the contents of at least two of the storage elements on the same display element.

13 Claims, 8 Drawing Sheets

(51) Int. Cl.
*H04N 21/443* (2011.01)
*G09G 3/04* (2006.01)

(56) References Cited

U.S. PATENT DOCUMENTS

2004/0243858 A1* 12/2004 Dennis et al. ............... 713/300
2008/0195875 A1* 8/2008 Hobson ........................ 713/320
2008/0235527 A1   9/2008 Heller et al.
2008/0238533 A1* 10/2008 Kato ............................. 327/535
2009/0288126 A1  11/2009 Candelore et al.
2011/0084979 A1*  4/2011 Rutman et al. ............... 345/589
2012/0226927 A1*  9/2012 Kagan et al. ................. 713/323

* cited by examiner

METHOD FOR CONTROLLING THE DISPLAY FOR AN ITEM OF EQUIPMENT IN STANDBY MODE AND ASSOCIATED DEVICE

This application claims the benefit, under 35 U.S.C. §119 of FR Patent Application 1157844, filed 5 Sep. 2011.

SCOPE OF THE INVENTION

The invention relates to the domain of receiver-decoder devices of audiovisual programmes and more precisely to display management in standby mode.

BACKGROUND OF THE INVENTION

The receivers/decoders of audiovisual programmes offer more and more functionalities to the user. In addition to the essential functions aimed at receiving, recording and displaying programmes, the equipment has numerous interfaces for, for example, the communication with third devices, the configuration or even electronic money. The increasing development of digital products for domestic use, such as, for example, television, computers, organizers, mobile phones, data storage devices, printers, also increases the number of interfaces of programme receivers to make the interconnection to different home equipment possible.

While configurations including a large number of devices and interfaces make it possible for the user to benefit from comfortable functionalities, they induce however a high energy consumption through circuit multiplication. So, it becomes more and more important to control the energy consumption of devices for domestic use and also the energy consumption of an entire installation and more widely of an entire home.

There are now European directives in terms of energy consumption. These directives must be considered with care during the design steps of general public devices.

The energy consumption high reduction constraint, coupled with the necessity to be able to wake up the devices creates problems. It is necessary to have standby modes corresponding to the lowest possible energy consumptions and necessary to be able to wake up a device in standby mode, which requires that a sub-assembly of the device enabling waking-up remains operational in standby mode.

It is then usual, with the purpose of meeting these constraints, to use an architecture which comprises a power supply, a motherboard and a keyboard and display management board, sometimes called KDB, from the English acronym "Key and Display Board".

In the following lines, the designations "motherboard", "power supply" and "Key and Display Board" or even "KDB" do not however correspond necessarily to independent electronic boards but designate all the components which participate in the associated function.

So, "motherboard" designates all the electronic circuits fulfilling the functions supported by the equipment apart from those supported by the KDB and the supply of energy lines supported by the power supply.

The "KDB" designation designates all the circuits corresponding to the remote control receipt, keyboard management and display functions, as well as the control unit functions in standby mode. But these circuits can however be located on the same electronic board as all the circuits called here "motherboard".

In the same way, the power circuits which enable the various supply lines to be provided in voltage and current from the electrical network to which the equipment is connected can be located on the same board as the circuits called here "motherboard".

The designations used here only enable the person skilled in the art to better understand the overall architecture of the equipment within the scope of which the invention falls.

The KDB supports the elements necessary for data receipt for equipment control by a remote control. The remote control can however use any other type of communication such as Bluetooth as an example.

This architecture based on a motherboard and a KDB enables an economical management of the energy since, in standby mode, it is possible and easy to cut off the power supply of a very large number of functions present on the motherboard, or even the entire motherboard by maintaining the KDB supplied and operational for display and keyboard management and the receipt of the remote control frames. It is indeed usual, when a device receiving audiovisual programmes is configured in standby mode, to use the keyboard or the remote control to wake up the device and return to active mode.

In standby mode, it is also usual that the display remains operational to indicate to the user the operating mode (standby mode) as well as other information like the time for example. In this mode, the KDB is sometimes fully autonomous, the motherboard not being operational and not implementing a software application likely to update the contents of the display memory.

An important constraint during the design of a device designed on the basis of this architecture is to simplify as much as possible the KDB for implementation, cost and modularity reasons.

The KDB generally consists of a microcontroller, a clock circuit for time stamping; a display module sometimes comprising a display controller, a keyboard constituted by a set of keys connected to the microcontroller and a remote control frame receiver, also connected to the microcontroller.

The inputs-outputs ports of the KDB microcontroller are used for the interconnections with the different elements and in particular to constitute the keyboard, often by key matrixing in lines and columns and receive the signals from the receiver of the remote control.

The display controller manages the display autonomously. The modification of the information to be displayed is done by writing into the memory of the display controller from the motherboard and when the device is not in standby mode. The main control unit of the device receiving audiovisual programmes writes into the memory of the display controller via a communication interface such as for example a bus 120.

During the design of a general public device such as, for example, a receiver recorder of audiovisual programmes, it is not rare to reuse the basic architecture of an existing product and adapt it to the specific needs defined in specifications. The display can, for example, be of various types, such as electroluminescent with LED ("Light Emitting Diode" or VFD ("Vacuum Fluo Display") or even of the LCD (Liquid Crystal Display) type and the information to be displayed for the user differ from one device to another.

According to the defined needs and the number of functions carried out by the device, the display must be able to display a more or less large number of information for the user like the number of the displayed programme, the time, messages constituted of alphanumeric characters, icons or pictograms symbolizing functions being used, maintenance or error information.

The adaptation of a display on an already existing KDB architecture is sometimes delicate since it can be necessary to integrate a display model while keeping the same display controller and the same microcontroller of the KDB.

The invention described enables, in the context defined above, the clever realisation of a display function when the memory of the display controller cannot be accessed in write mode, the equipment being in standby mode. The display must be modified according to the occurrence of an event.

SUMMARY OF THE INVENTION

The invention enables at least one of the disadvantages of the prior art to be solved by allowing a modification of the display on a general public product, upon detection of an event, whereas the memory of the display controller cannot be accessed in write mode by the application, the equipment being in standby mode.

In the following paragraphs, the term "pictogram" designates a display entity for which the display state may be related to (depends on) the state of a binary digit unit (bit) of the display memory. Thus, it is a display entity characterized in that it is made of a unique and indissociable element. This could then be either corresponding to the meaning of the word "pictogram" as generally used, meaning that its form/look corresponds to an idea or a concept, or to a simple display element such as, for example, a dash or a dot, a double-dot, a bar, an icon, a segment.

The meaning of the term "pictogram" in the following paragraphs will also be better understood by reading FIGS. 3 to 7.

The invention describes a method for controlling a display device in an electronic device, the electronic device comprising a control unit and the display device comprising at least a display element, a display controller and a switching circuit, the display element comprising at least one pictogram, the display controller comprising a first memory comprising a memory element associated with the display element, the storage element being composed of at least one binary element, associated with the pictogram, the method being characterized in that it uses a second memory comprising at least a storage element and in that it comprises the steps for writing a contents into the storage element of the first memory and into the storage element of the second memory, for configuring in standby mode of the electronic device, for detecting by a microcontroller connected to the switching circuit of an event to be signalled by display and for controlling, by said microcontroller, of the switching circuit to modify the display of the display element by alternately associating it with the storage element of the first memory and the storage element of the second memory.

According to an embodiment of the invention, the step for writing contents into the storage elements is preceded by a detection by the control unit of a signal for changeover to standby mode.

According to another embodiment of the invention, the step for detecting an event corresponds to the receipt of a data frame emitted by the remote control of the electronic device.

Advantageously, the step for detecting an event corresponds to the detection by a microcontroller connected to the switching circuit of the variation of a signal after pressing a key of the keyboard of the electronic device.

According to an embodiment of the invention, the step for detecting an event corresponds to the detection, by a microcontroller connected to the switching circuit, of the equality between the current time and a preprogrammed time leading to the activation of a function of the electronic device.

The invention also relates to a display device in an electronic device comprising at least a display element and a display controller, the display element comprising at least a pictogram and the display controller comprising a first memory composed of at least a storage element associated with the display element, the device being characterized in that it also comprises a second memory composed of at least a storage element and switching means enabling the storage element of the second memory to be associated with the display element.

According to an embodiment of the invention, the electronic device comprises configuration means in standby mode and a control unit, the control unit not being able to have access to the first memory and to the second memory in standby mode.

According to an embodiment of the invention, the electronic device is a receiver of audiovisual programmes.

According to an embodiment of the invention, the pictogram indicates the receipt of a command emitted by the remote control of the electronic device.

So, the invention enables a display device to be controlled in an electronic device, allowing the activation or the flickering of a display representative of an event when the electronic device is configured in standby mode and the display control memory cannot be accessed in write mode to modify the contents of the information displayed.

An advantage of the invention is that it is therefore possible to indicate to the user that a command emitted via the remote control is actually taken into account by the equipment, by causing flickering of a pictogram of the display in standby mode.

BRIEF DESCRIPTION OF THE DRAWINGS

The invention will be better understood, and other specific features and advantages will emerge upon reading the following description, the description making reference to the annexed drawings wherein:

In FIGS. 1 to 7, the modules shown are functional units that may or may not correspond to physically distinguishable units. For example, these modules or some of them can be grouped together in a single component, or constitute functions of the same software. On the contrary, some modules may be composed of separate physical entities.

DETAILED DESCRIPTION OF PREFERRED EMBODIMENTS

Generally but not restrictively, the invention relates to a method for controlling the display of an equipment decoding audiovisual programmes allowing the activation, deactivation or even flickering (or blinking) of a pictogram indicating the receipt of a frame of the remote control when the equipment is in standby mode and the display memory cannot be accessed in write mode.

Figure 1:
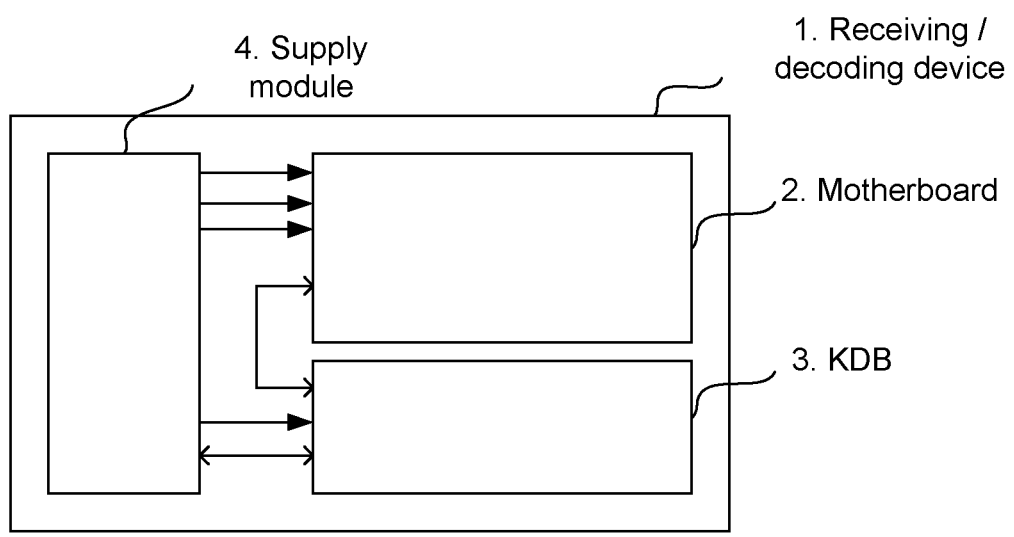
FIG. 1 illustrates an electronic device structured in 3 modules.

FIG. 1 illustrates the overall architecture of a device receiving audiovisual programmes 1. The device 1 is constituted by a supply module 4 providing the supply lines for a motherboard 2 and for a module KDB 3. The KDB (Key and Display Board) module is always supplied by the supply module 4 and manages the waking up of the device 1 to exit the standby mode by controlling the supply module 4. In standby mode, all or part of the supply lines which provide the voltages to the motherboard 2 are deactivated, which allows large energy savings in standby mode. The motherboard 2 comprises the main control unit of the device 1 and the KDB 3 comprises the elements necessary for the display functions, the keyboard and the data receiver for a remote control. When the motherboard 2 is in standby mode, its control unit can no longer write into the memory of the display controller located on the KDB module 3. The method which constitutes the invention is then used to cause flicking (or blinking) of an associated pictogram during the receipt of data frames emitted by the remote control.

Figure 2:
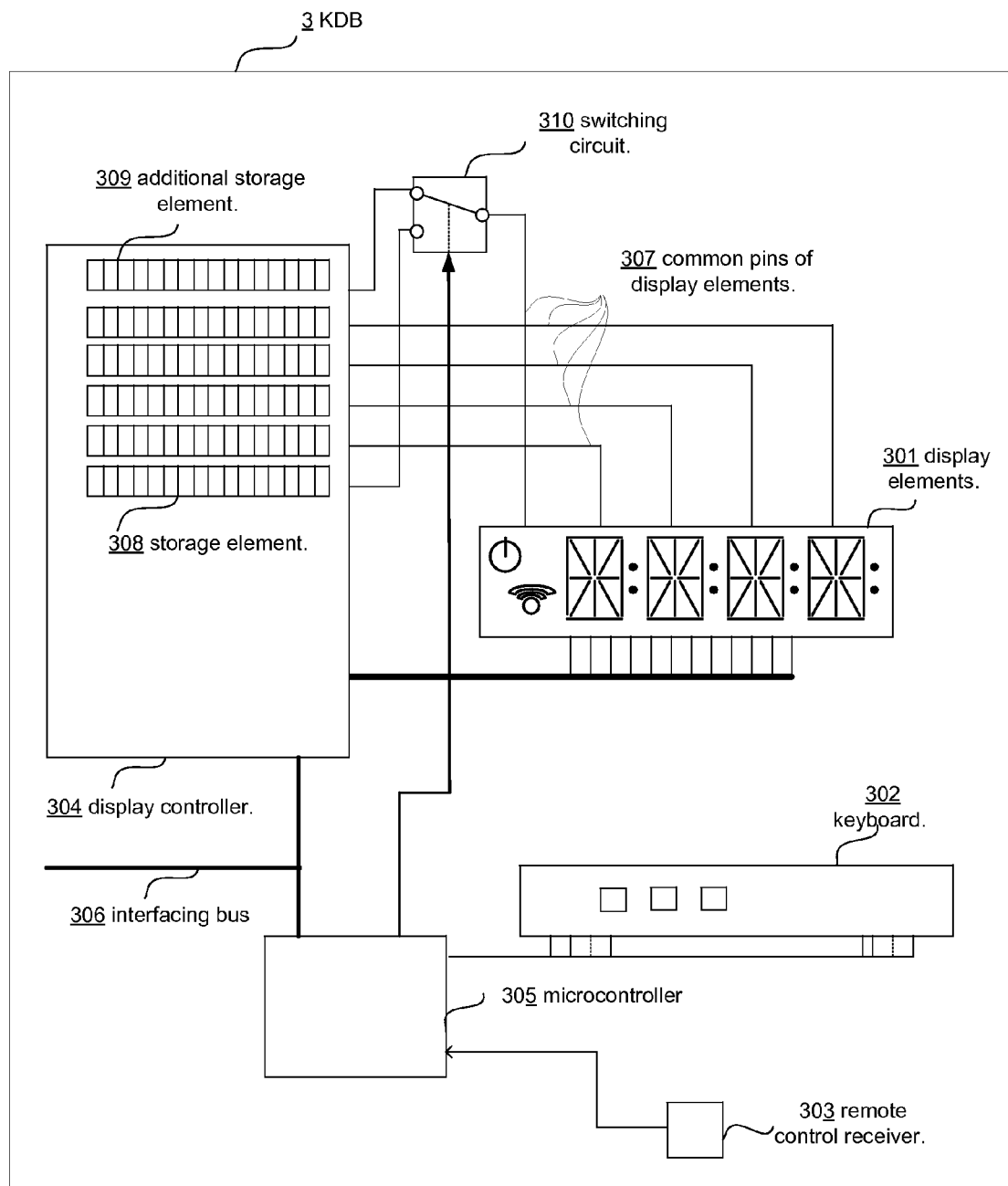
FIG. 2 illustrates a KDB module according to an embodiment of the invention.

FIG. 2 illustrates the KDB module 3 used and represented in FIG. 1 according to an embodiment of the invention. The KDB 3 comprises a display device 301, a keyboard 302, an infra-red remote control receiver 303, a display controller 304 and a microcontroller 305. The microcontroller 305, as well as the display controller 304, ensure the main part of the operations necessary for the management of the display, of the keyboard and of the remote control when the receiver decoder device is in standby mode and when all or part of the modules of the motherboard are not supplied.

The exchanges with the control unit of the motherboard are done by means of the interfacing bus 306.

The display controller 304 comprises storage elements 308 respectively associated with the display elements of the display device 301 and an additional storage element 309. The switching circuit 310, controlled by the microcontroller 305, enables the additional storage element to be associated with a display element normally associated with another storage element.

The display on the display elements of the display device 301 is sequentially done by the display controller 304 which successively activates the common pins 307 of the display elements.

When a request for setting in standby mode is detected by the control unit of the motherboard, the control unit writes into the storage elements 308 of the display controller 304. Writing is done by means of the interfacing bus 306. The control unit then writes the contents corresponding to the display in standby mode (storage elements associated with the display elements) as well as the contents of the additional storage element 309.

Upon the receipt of a data frame emitted by the equipment remote control by the remote control receiver 303, the data received is transmitted to the microcontroller 305 for processing. The microcontroller detects and processes the data frame and controls the switching circuit 310 so that the display element containing the pictogram representative of the receipt of data from the remote control is alternately associated with the contents of the associated storage element (308) and with the contents of the additional storage element (309). At the display element level, it is just as if the contents of the associated storage element were modified. However, this involves associating by switching another storage element loaded beforehand with a content different from the storage element normally associated with the display element.

The control lines of the pictograms of the display element and therefore the display are varied in this way.

Indeed, if the two storage elements 308 and 309 which can be associated in this way with the display element which contains the pictogram indicating the receipt of a data frame from the remote control are preloaded with contents corresponding for one to the activation of the pictogram and for the other to its deactivation, the alternate switching leads to flickering of the pictogram. In standby mode, the binary element corresponding to the activation of the pictogram for the representation of the standby mode is set to 1 (activation state) in the two storage elements (that associated with the display element and the additional storage element).

It is possible in this way to modify the display of the display device 301 to cause blinking of a pictogram, provided that the storage elements 308 and 309 of the display controller 304 are preloaded with the necessary logical information before changeover to the standby mode of the device. The standby mode making the memory inaccessible by the control unit of the device motherboard. The switching circuit 10 is, according to the embodiment of the invention, composed of electronic switches enabling the common pins of the relevant display elements to be connected or disconnected. The switching circuit 310 is controlled by a signal connected to an output port of the microcontroller 305 of the KDB. The software executed by the microcontroller controls the switching circuit 310 upon detection of the signal from the receiver of the remote control 303, the receiver 303 being connected to an input port of the microcontroller 305.

Figure 3:
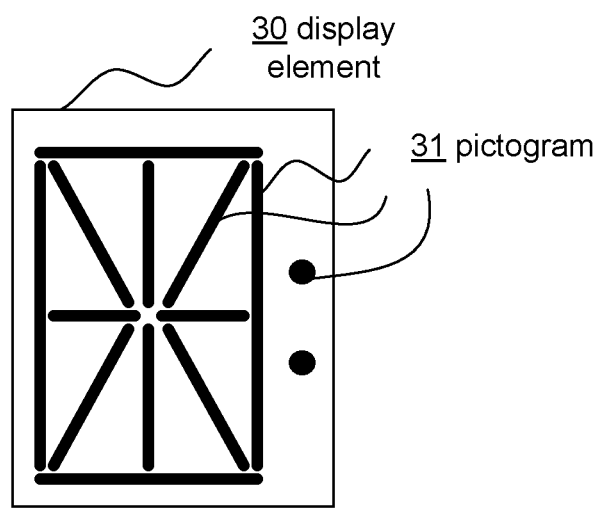
FIG. 3 illustrates a display element comprising pictograms.

FIG. 3 shows a display element 30 such as used in the display device represented in FIG. 2. The display element is composed of a set of pictograms 31 which can be independently activated or deactivated. An activated pictogram is visible to the user of the device whereas a deactivated pictogram is not visible. According to the embodiment, a pictogram is activated and visible when the corresponding binary element (bit) of the associated storage element is set to 1. Conversely, when the storage element is set to 0, the pictogram is deactivated and invisible to the user of the equipment.

The activation of the pictograms is done by the display controller and operates according to the principle of a common pin which is connected to a supply voltage. Each pictogram is then associated with a specific pin of the display element. The logic state of an activation pin (and of the associated binary element) defines the activation state and the visibility of the pictogram. This type of control with a common pin is commonly used and enables the number of pins and connections necessary to the electronic circuit to be limited.

When a display device uses several display elements, such as the device 301, the control of the elements is multiplexed. The elements are sequentially controlled with a multiplexing frequency which makes this sequencing invisible to the user owing to the human retinal persistence. This system enables energy to be saved and above all a large number of pins and interconnections for the electronic circuit. During the successive control of each of the display elements, the display controller sets on the activation pins the contents of the corresponding storage element.

Figure 4:
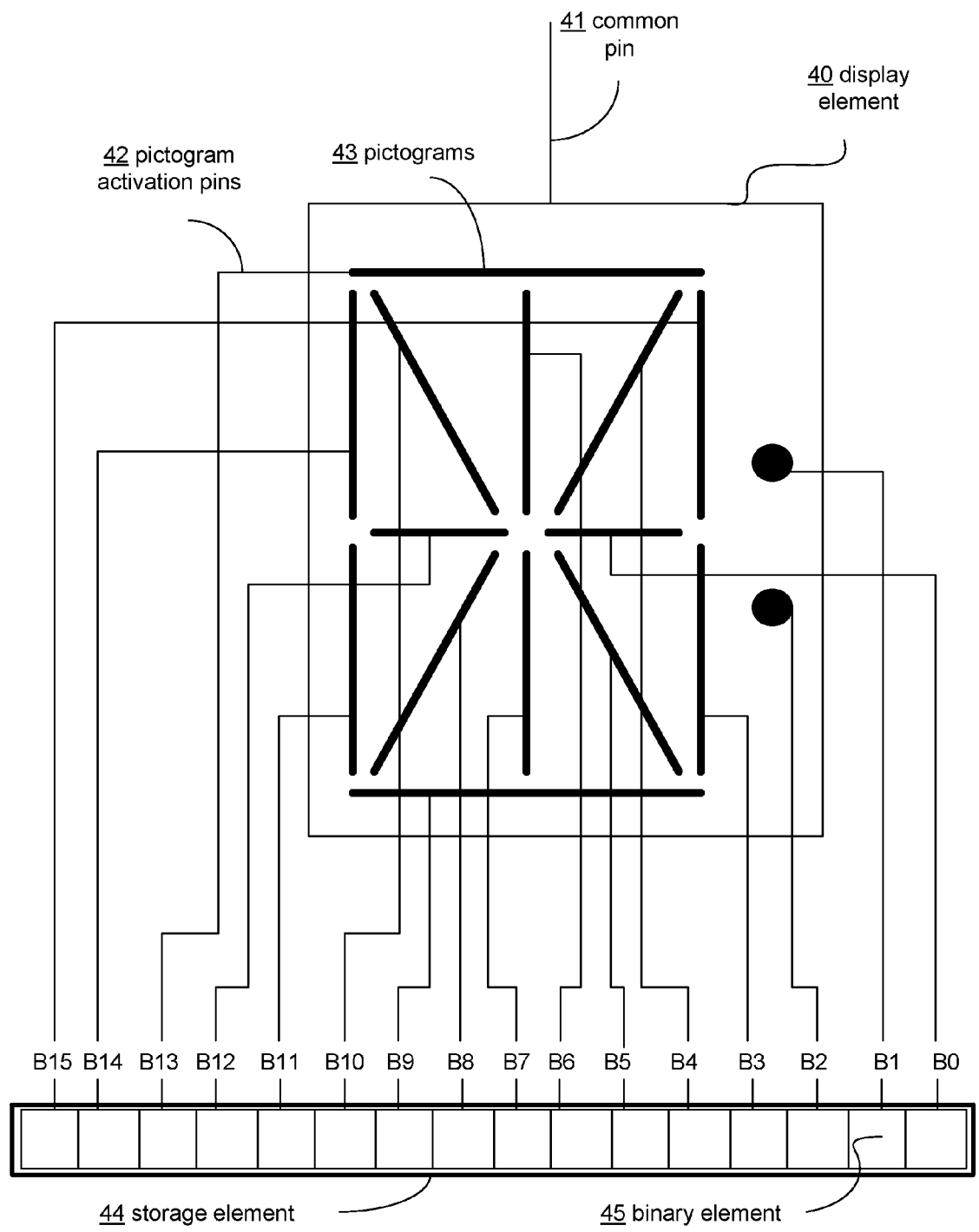
FIG. 4 diagrammatically illustrates a display element and the associated storage element.

FIG. 4 represents a display element 40 identical to that described in FIG. 3 and also shows the interconnections between the pictograms 43 and the activation pins, illustrating in this way the connection mode used. The bit position of a storage element of the display controller induces an electric state of the corresponding pin and makes the associated pictogram visible. The common pin 41 and the pictogram activation pins 42 are distinguished. The state of an activation pin depends on the state of the binary element (bit) 45 of the storage element 44 of the display controller associated with the display element.

According to the embodiment, a storage element is composed of 16 binary elements identified B15 to B0.

To each display element corresponds a storage element of the display controller and to each pictogram corresponds a binary element with the exception of the pictogram indicating the receipt of a remote control data frame since it is cleverly associated alternately with another storage element by switching circuit control.

Figure 5:
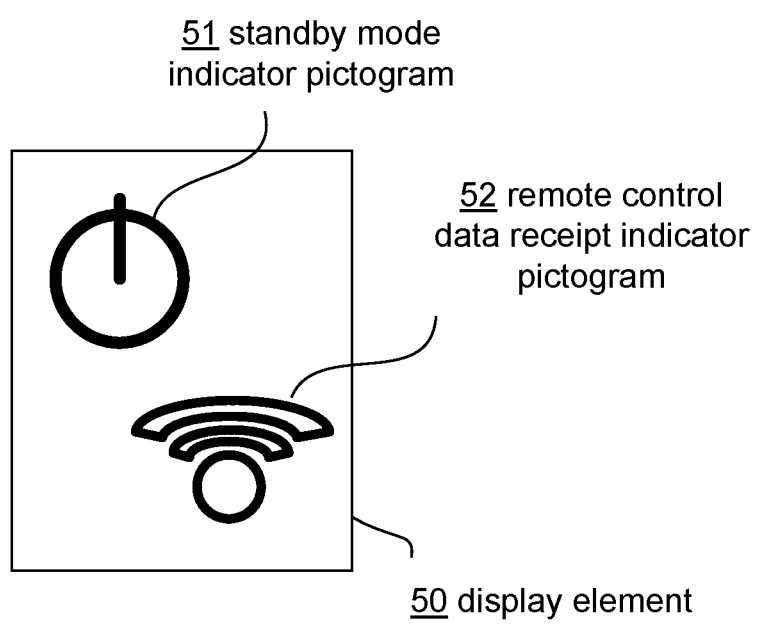
FIG. 5 illustrates a display element containing the pictograms representative of the use of the standby mode and of the receipt of data emitted by the remote control of the device.

FIG. 5 illustrates a display element 50 comprising a pictogram 51 representative of the standby mode activation as well as a pictogram 52 representative of the receipt of remote control frames. This display element has two pins respectively corresponding to the activation of each of the two pictograms in addition to the common pin. Just as with the generic display elements 30 and 40 enabling alphanumeric characters to be displayed according to the combinations of activated pictograms, the logic state of the pictogram activation pins of the display element 50 corresponds to the state of the associated storage elements of the display controller.

A binary element of the storage element associated with this display element corresponds to the standby mode representation pictogram and another binary element of the storage element corresponds to the pictogram for representing the receipt of a data frame emitted by the remote control.

Figure 6:
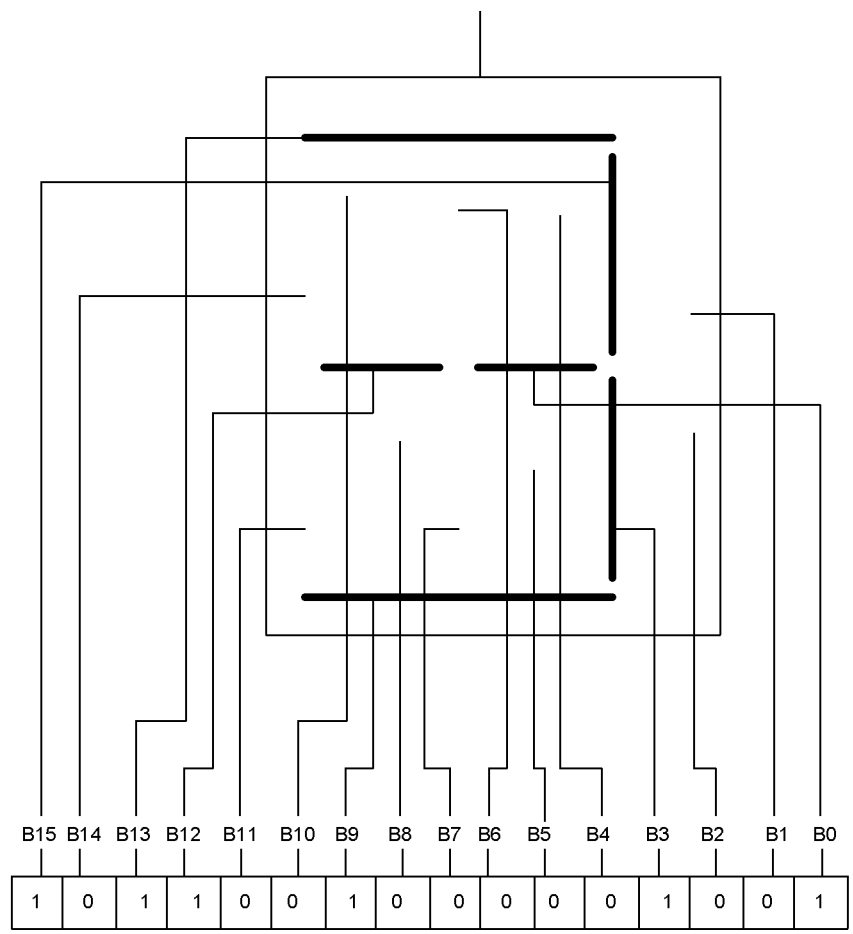
FIG. 6 illustrates a display element and its associated storage element whose binary elements have been loaded.

FIG. 6 represents the display of numeral "3" on a display element by writing the contents "1011001000001001" into the storage element associated with the display element.

Figure 7:
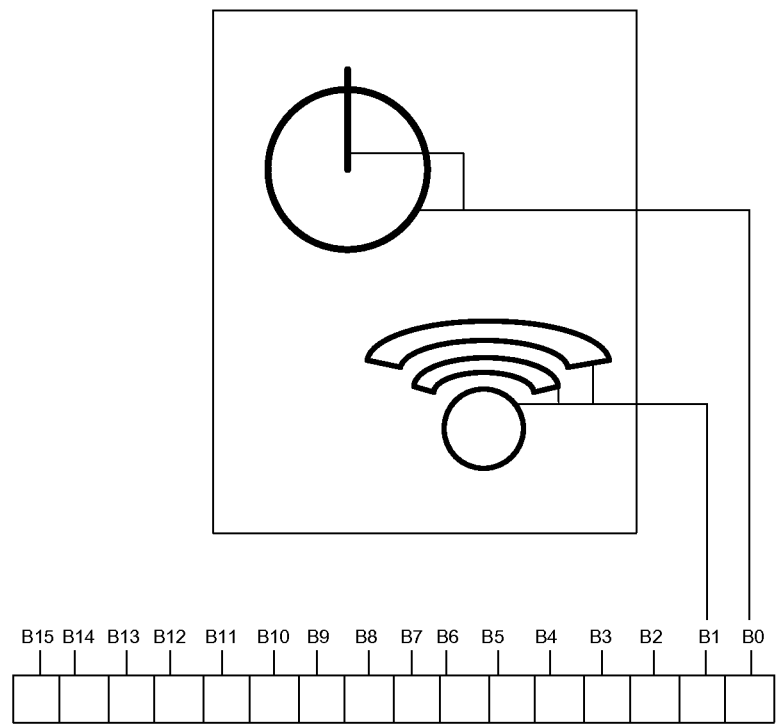
FIG. 7 illustrates a display element containing the pictograms representative of the use of the standby mode and of the receipt of data emitted by the remote control of the device as well as the associated storage element.

FIG. 7 represents the display element of FIG. 3 by showing the associated storage element and the correspondence between the pictograms and the binary elements of the associated storage element.

In this case, the display element only comprises two pictograms. Only two binary elements (or bits) of the storage element are then associated with the pictograms.

Figure 8:
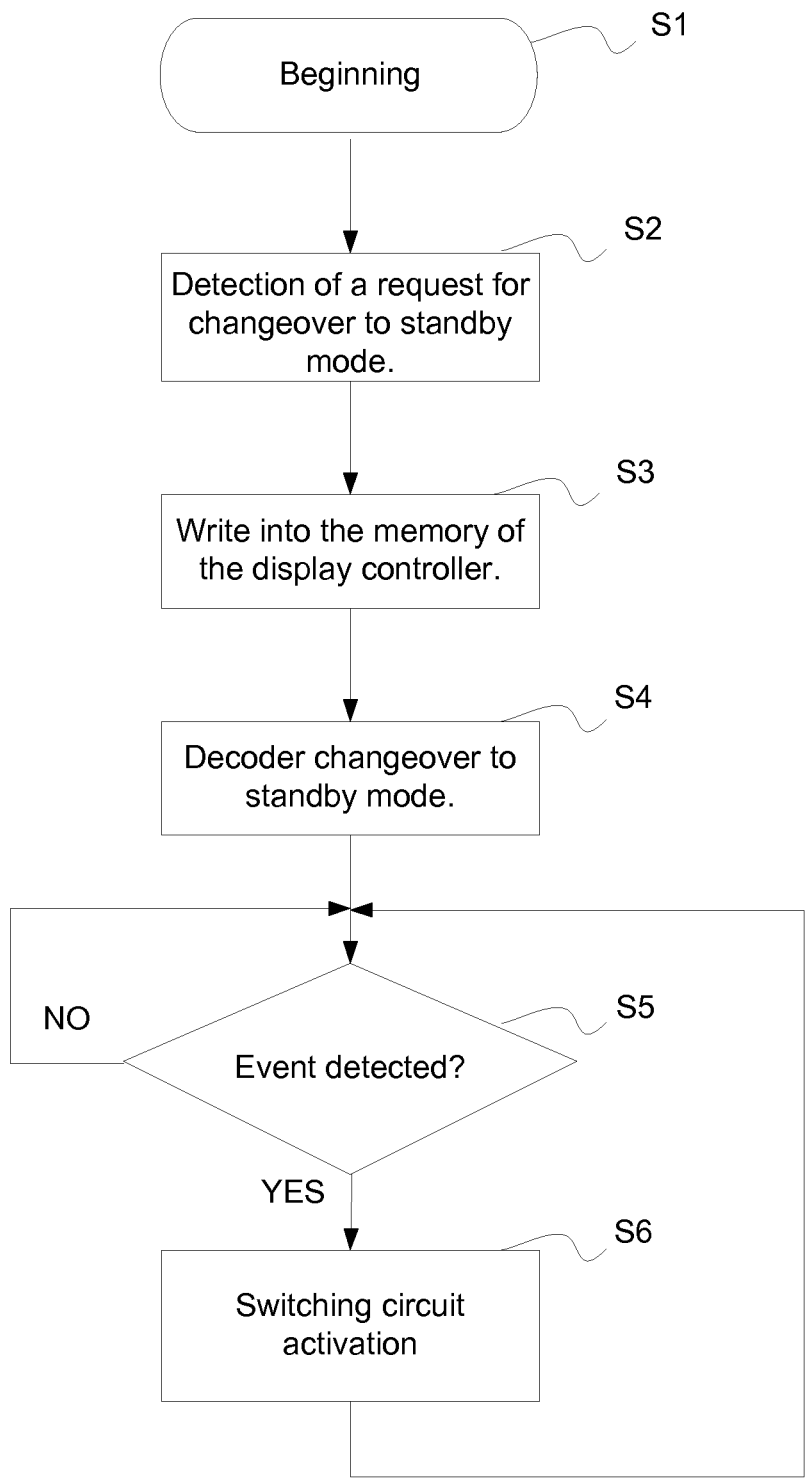
FIG. 8 is a functional diagram representing the steps of the method.

FIG. 8 is a functional diagram illustrating the method.

The step S1 represents the initial step of the method. The decoder is in the nominal operating state and can in particular receive and decode an audiovisual programme or ensure any other function available in this mode.

The step S2 corresponds to the detection of a request for changeover to standby mode. This detection can occur following the receipt of a data frame from the remote control and comprising the code corresponding to the changeover to standby mode (the user then sets the equipment to standby mode) but can, for example, be preprogrammed or be automated in the absence of activation of the equipment functions during a predefined period. According to the embodiment, from that moment, only information useful for the display in standby mode can be written into the memory of the display controller in order to avoid their possible overwriting prior to changeover to standby mode. The actual changeover to standby mode making access to the memory of the display controller impossible.

The step S3 corresponds to the writing into memory of the display controller of the contents to be displayed during the standby mode as well as of the contents of the additional storage element and whose contents can be displayed in standby mode by using the switching circuit on a display element already associated with another storage element.

The step S4 corresponds to the changeover to standby mode of the decoder. All or part of the motherboard is deactivated and the main control unit of the decoder is deactivated and no longer makes it possible to have access in write mode to the memory of the KDB display controller.

At step S5, the motherboard is in standby mode but the KDB remains active and sensitive to the occurrence of events. In this way, by means of its remote control receiver, the KDB is capable, amongst other things, of detecting the receipt of a data frame emitted by the remote control.

At step S6, and following the detection of a data frame emitted by the remote control, the KDB microcontroller, to which the signal from the remote control receiver is connected then activates the switching circuit for a predetermined period. The switching circuit then alternately switches the display module control signals to alternately display on the same display element the contents of two storage elements. The display element then displays the contents preloaded before the setting to standby mode. The contents being predefined so that this corresponds to the blinking of the pictogram symbolizing the receipt of data emitted from the remote control. When the switching circuit activation duration has elapsed, the process goes back to step S4, waiting for an event likely to be reported by way of display on a display element. In the case where the data emitted by the remote control indicates to the KDB microcontroller that the decoder must exit the standby mode, the KDB controls the supply module and the motherboard to reactivate the nominal operating mode. The process then goes back to the initial step S1.

According to an embodiment, the switching circuit can be statically controlled to turn on or off a pictogram without flickering or blinking effects.

According to another embodiment, the detected event can be independent of the remote control and occur by equality detection between the current time and a preprogrammed time, the KDB ensuring the system clock function. The decoder can then for example activate a function such as the recording of the flow being received on a connected peripheral and indicate with the appearance of a pictogram the activation of this recording function. The activation of a function of this type is however only possible if elements of the decoder motherboard remain active although it is in standby mode. Indeed, there are different types of standby modes which correspond to degraded modes of the decoder nominal operation and enable some functions to be activated whereas others are deactivated to save energy. It is therefore possible, according to another embodiment of the invention, to detect that the current time corresponds to the programming time of an audiovisual programme recording and to implement this recording although being outside of the nominal operating mode, when the main control unit of the decoder cannot write into the memory of the display controller, and to indicate the recording by displaying an associated pictogram, by activating the switching circuit. The pictogram having been preloaded into a storage element of the display controller and the activation circuit being controlled to display the contents of this storage element on a display element.

The invention also relates to any electronic device likely to be configured in standby mode and structured in such a way that the control unit cannot have access to the display controller memory and enable the pictograms visible to the user to be modified in order to report an event. The relevant electronic devices are, as an example, TV sets, programme players, receivers of broadcast data, games consoles, screens.

The invention claimed is:

1. Method for controlling a display device in an electronic device comprising a main control unit, said display device comprising at least one display element, one display controller and one switching circuit, said at least one display element comprising at least one pictogram, said display controller comprising a first memory comprising at least one storage element associated with said at least one display element and a second memory comprising at least one storage element, said method comprising:
- writing, by said main control unit, of a content into said at least one storage element of said first memory and into said at least one storage element of said second memory,
- configuring said electronic device in a standby mode, said configuring making said first and said second memory inaccessible for writing by said main control unit,
- detecting, by a microcontroller connected to said switching circuit, an event to be indicated by display, wherein said method further comprises, when said electronic device is in said standby mode:
- controlling, by said microcontroller, said switching circuit to modify a display of said at least one display element by alternately associating it with said at least one storage element of said first memory and with said at least one storage element of said second memory.

2. Method according to claim 1 wherein the step of writing a contents into said storage elements is triggered by a detection by said main control unit of a signal for changeover to standby mode.

3. Method according to claim 1, wherein the detected event corresponds to a receipt of a data frame emitted by a remote control of said electronic device.

4. Method according to claim 1, wherein detecting an event comprises detecting, by a microcontroller connected to said switching circuit, a variation of a signal following a pressing of a key of a keyboard of the electronic device.

5. Method according to claim 1, wherein detecting an event comprises detecting, by a microcontroller connected to said switching circuit, an equality between a current time and a preprogrammed time, leading to an activation of a function of said electronic device.

6. The method according to claim 1 wherein said electronic device is a receiver of audiovisual programmes.

7. The method according to claim 1 wherein at least one pictogram is a pictogram which activation indicates a receipt of a command emitted by a remote control of said electronic device.

8. Display device in an electronic device comprising a main control unit, said display device comprising at least one display element, a display controller and a switching circuit,
- said at least one display element comprising at least one pictogram,
- said display controller comprising
  - a first memory composed of at least one storage element associated with said at least one display element, wherein:
- said display controller further comprises a second memory,
- said display device comprises a microcontroller adapted to detect an event to be indicated by display;
- said main control unit is adapted to write content into said first and second memory and said electronic device is adapted to be configured in a standby mode, in which said first and second memory are inaccessible for writing by said main control unit,
- said switching circuit is adapted for associating at least one display element alternately to said second memory and to said at least one storage element of said first memory, and being able to be triggered by said microcontroller when said electronic device is in said standby mode.

9. Display device according to claim 8 wherein said electronic device is a receiver of audiovisual programmes.

10. Display device according to claim 8 wherein at least one pictogram is a pictogram which activation indicates a receipt of a command emitted by a remote control of said electronic device.

11. The display device according to claim 8, wherein said event to be detect corresponds to a receipt of a data frame emitted by a remote control of said electronic device.

12. The display device according to claim 8, wherein said micro controller is connected to said switching circuit and is adapted for detecting a variation of a signal following a pressing of a key of a keyboard of the electronic device.

13. The display device according to claim 8, wherein said micro controller is connected to said switching circuit and is adapted for detecting an equality between a current time and a preprogrammed time, leading to an activation of a function of said electronic device.

* * * * *